United States Patent
Gaile et al.

(10) Patent No.: US 10,794,361 B2
(45) Date of Patent: Oct. 6, 2020

(54) ADJUSTMENT UNIT FOR ADJUSTING THE PITCH OF A ROTOR BLADE, AND WIND TURBINE WITH SUCH AN ADJUSTMENT UNIT

(71) Applicant: Liebherr-Components Biberach GmbH, Biberach an der Riss (DE)

(72) Inventors: Anton Gaile, Leutkirch (DE); Jan Fesenmayr, Leutkirch (DE); Stefan Cersowsky, Koenigsbronn (DE); Thomas Schulze, Biberach an der Riss (DE)

(73) Assignee: LIEBHERR-COMPONENTS BIBERACH GMBH, Biberach an der Riss (DE)

( * ) Notice: Subject to any disclaimer, the term of this patent is extended or adjusted under 35 U.S.C. 154(b) by 534 days.

(21) Appl. No.: 15/556,528

(22) PCT Filed: Mar. 8, 2016

(86) PCT No.: PCT/EP2016/000408
§ 371 (c)(1),
(2) Date: Sep. 7, 2017

(87) PCT Pub. No.: WO2016/142054
PCT Pub. Date: Sep. 15, 2016

(65) Prior Publication Data
US 2018/0051674 A1 Feb. 22, 2018

(30) Foreign Application Priority Data

Mar. 11, 2015 (DE) .................. 20 2015 001 902 U
Apr. 2, 2015 (DE) ........................ 10 2015 004 349

(51) Int. Cl.
F03D 7/02 (2006.01)
F03D 80/70 (2016.01)
F03D 1/06 (2006.01)

(52) U.S. Cl.
CPC ......... *F03D 7/0224* (2013.01); *F03D 1/0658* (2013.01); *F03D 80/70* (2016.05);
(Continued)

(58) Field of Classification Search
CPC ...... F03D 1/0658; F03D 7/0224; F03D 80/70; F05B 2260/71; F05B 2260/74;
(Continued)

(56) References Cited

U.S. PATENT DOCUMENTS 3,689,087 A * 9/1972 Flett .................... B23Q 1/70
279/4.01
2008/0292462 A1 11/2008 Munch
(Continued)

FOREIGN PATENT DOCUMENTS

AU 2009337882 A1 10/2010
DE 3110263 C2 3/1982
(Continued)

OTHER PUBLICATIONS

WO2008068373 machine translation (Year: 2008).*
(Continued)

*Primary Examiner* — Carl C Staubach
(74) *Attorney, Agent, or Firm* — McCoy Russell LLP

(57) ABSTRACT

The present invention relates to wind turbines with variable rotor blades whose pitch angles are adjustable. An adjustment unit is provided for adjusting the pitch angle of the rotor blades with a pivot bearing comprising at least two coaxial bearing rings that are rotatable against each other, at least one adjustment actuator for rotating the two bearing rings, and a supply unit for supplying the adjustment actua-
(Continued)

tor with energy, whereby the adjustment actuator and the supply unit are disposed on opposite sides on a plate-shaped adjustment drive carrier part which is rotatably connected with one of the bearing rings and comprises a rotatable support bearing for the support of the adjustment actuator. A least one part of the supply unit is rotatably mounted on the carrier part such that the supply unit or its rotatably mounted part and the adjustment actuator are jointly rotatably mounted and/or swivel-mounted on the carrier part.

19 Claims, 6 Drawing Sheets

(52) U.S. Cl.
CPC ....... *F05B 2260/71* (2013.01); *F05B 2260/74* (2013.01); *F05B 2260/76* (2013.01); *F05B 2260/79* (2013.01); *Y02E 10/721* (2013.01); *Y02E 10/723* (2013.01); *Y02E 10/726* (2013.01)

(58) Field of Classification Search
CPC ............. F05B 2260/76; F05B 2260/79; Y02E 10/721; Y02E 10/723; Y02E 10/726
See application file for complete search history.

(56) References Cited

U.S. PATENT DOCUMENTS

| | | |
|---|---|---|
| 2010/0232964 A1 | 9/2010 | Geiger |
| 2011/0020136 A1* | 1/2011 | Numajiri ............... F03D 7/0224 416/246 |
| 2012/0063901 A1* | 3/2012 | Matsuda ............... F03D 7/0224 416/156 |
| 2013/0084182 A1 | 4/2013 | Röer |
| 2014/0301847 A1* | 10/2014 | Neubauer ............. F03D 1/0658 416/147 |
| 2014/0328679 A1 | 11/2014 | Nielsen et al. |
| 2015/0152842 A1* | 6/2015 | Gaile ........................ F03D 9/25 416/153 |
| 2016/0312766 A1* | 10/2016 | Rasmussen ........... F03D 7/0224 |

FOREIGN PATENT DOCUMENTS

| | | |
|---|---|---|
| DK | 201300717 A1 | 2/2014 |
| EP | 2458209 A2 | 5/2012 |
| KR | 100987760 B1 | 10/2010 |
| WO | 2004076855 A1 | 9/2004 |
| WO | 2008068373 A1 | 6/2008 |
| WO | 2012069062 A1 | 5/2012 |
| WO | 2013079071 A1 | 6/2013 |
| WO | 2014009011 A2 | 1/2014 |
| WO | 2016142055 A1 | 9/2016 |

OTHER PUBLICATIONS

ISA European Patent Office, International Search Report Issued in Application No. PCT/EP2016/000408, dated May 20, 2016, WIPO, 6 pages.

ISA European Patent Office, International Search Report Issued in Application No. PCT/EP2016/000409, dated May 23, 2016, WIPO, 6 pages.

* cited by examiner

ADJUSTMENT UNIT FOR ADJUSTING THE PITCH OF A ROTOR BLADE, AND WIND TURBINE WITH SUCH AN ADJUSTMENT UNIT

CROSS-REFERENCE TO RELATED APPLICATION

The present application is a U.S. National Phase of International Patent Application Serial No. PCT/EP2016/000408, entitled "CONTROL UNIT FOR CONTROLLING THE PITCH OF A ROTOR BLADE, AND A WIND TURBINE COMPRISING SUCH A CONTROL UNIT," filed on Mar. 8, 2016. International Patent Application Serial No. PCT/EP2016/000408 claims priority to German Utility Model Application No. 20 2015 001 902.1 filed on Mar. 11, 2015 and German Patent Application No. 10 2015 004 349.8, filed on Apr. 2, 2015. The entire contents of each of the above-identified applications are hereby incorporated by reference in their entirety for all purposes.

TECHNICAL FIELD

The present invention relates to wind turbines in general with variable rotor blades whose pitch angle can be adjusted. In particular, the invention relates to an adjustment unit for adjusting the pitch angle of a wind turbine rotor blade with a pivot bearing comprising at least two coaxial bearing rings that are rotatable relative to each other, at least one adjustment actuator for rotating the two bearing rings relative to each other, and a supply unit for supplying the adjustment actuator with energy, wherein the at least one adjustment actuator and the supply unit are disposed on opposite sides on a plate-shaped adjustment drive carrier part which is directly or indirectly non-rotatably connected with one of the bearing rings.

BACKGROUND AND SUMMARY

In modern wind turbines, the pitch angle of the rotor blades can be adjusted to adapt the flow conditions of the rotor blades and the torque produced by the rotor blades to variable operating conditions such as when the unit is turned off, and in particular to adapt to different wind velocities and wind conditions. For this purpose, the rotor blades are usually mounted on the rotor about their longitudinal axis by means of large-diameter roller bearings or plain bearings such that the rotor blades can be rotated about their longitudinal blade axes relative to the rotor hub such that the pitch angle of the rotor blades can be changed. The adjustment unit for adjusting said pitch angle of a rotor blade usually comprises an actuator disposed in the area of the pivot bearing between the rotor hub and the rotor blade and which rotates the two bearing rings of the pivot bearing relative to each other by means of at least one preferably linearly working adjustment actuator, either by directly engaging in the bearing rings or indirectly in components connected with same such as the rotor hub or the rotor blade itself or with structural parts connected with same such as the reinforcing plates for reinforcing the bearing rings.

WO 2012/069052 A1 describes a wind turbine in which the adjustment unit for adjusting the pitch angle of the rotor blades comprises a pair of hydraulic cylinders for each rotor blade and an associated supply unit with pressure accumulators and control valves mounted on a carrier plate which closes the inner ring of the pivot bearing and is rotationally fixed to the rotary hub. The said supply unit with pressure accumulators and control valves is mounted on the inside, i.e. on the side of the carrier plate facing the rotor hub, while the pair of hydraulic cylinders is mounted on the outside of the carrier plate where it is supported on one side by the carrier plate and on the other side by a structural part connected with the outer ring of the pivot bearing, such that by extending and retracting the hydraulic cylinders the outer ring can be rotated relative to the inner ring and thus the pitch angle of the rotor blade can be adjusted.

Similar pitch adjustment systems for the rotor blades of wind turbines are known from EP 2458209 A2, AU 2009/337882 A1 or WO 2014/009011 A2.

One such adjustment drive is characterized by its compact configuration since an arrangement in the inner space surrounded by the bearing rings can be achieved through the separation of adjustment actuator and supply unit on different sides of the carrier plate. Furthermore, the adjustment drive together with the pivot bearing can be combined in a module that can be pre-assembled.

However, the separation between supply unit and adjustment actuators on opposite sides of the carrier plate leads to the problem that the carrier plate has to comprise relatively large conduit recesses for the supply lines, which reduces the strength of the carrier plate and thus its stiffening effect for the bearing ring. This problem is exacerbated by the fact that the adjustment actuators rotate relative to the carrier plate and thus relative to the adjustment unit when the pitch is adjusted, which means that the conduit openings for the supply lines must be large enough to compensate for the rotational skew. On the other hand, this can lead to a collision problem, especially when—in case of large rotor blades and thus greater forces to be controlled—several adjustment actuators are provided to adjust a rotor blade. Furthermore, the constant back and forth bending of the lines and cables leads to fatigue and to excessively long lines and cables when these are given sufficient bending radius for combatting these fatigue problems.

Based on this, it is the object of the present invention to provide an improved wind turbine and an improved adjustment unit for adjusting in particular the pitch angle of a rotor blade, to avoid the disadvantages inherent in the state of the art and to further develop the latter in an advantageous manner. In particular, a small-scale, compact adjustment unit is to be provided which weakens the structure and stiffening of the rotational bearing as little as possible, and which—if possible—circumvents the collision problem when the bearing parts are rotated.

The invention achieves this object by means of a wind turbine with a rotor comprising rotor blades with adjustable pitch angles, with an adjustment unit for adjusting the pitch angles of the rotor blades; wherein the adjustment unit comprises a pivot bearing including at least two coaxial bearing rings that are rotatable against each other, at least one adjustment actuator for rotating the two bearing rings against each other, and a supply unit for supplying the adjustment actuator with energy, wherein the at least one adjustment actuator and the supply unit are disposed on an adjustment drive carrier part which is directly or indirectly rotatably connected with one of the bearing rings, wherein the supply unit is rotatably mounted on the carrier part such that the supply unit and the adjustment actuator are together rotatably mounted on the carrier part without rotating against each other, and that they are jointly rotatable and/or pivotable in relation to the carrier part.

It is recommended that not only the at least one adjustment actuator, but also the supply unit is rotatably mounted opposite the carrier part on which the adjustment actuator is supported, such that when the pitch of the rotor blade is adjusted and thus when the bearing rings are rotated relative to each other, the one adjustment actuator as well as its supply unit can rotate or pivot relative to the adjustment drive carrier part. According to the invention, at least a part of the supply unit together with the adjustment actuator is rotatably mounted on the carrier part, such that the supply unit or its rotatably mounted part and the adjustment actuator are jointly rotatable and/or pivotable against each other opposite the carrier part. Due to the absence of relative movements between the adjustment actuator and the supply unit, the connections between the adjustment actuator and the supply unit can be distinctly simplified, and fatigue problems due to the lines and cables bending back and forth can be prevented.

In particular, the rotatable mounting of the supply unit can be combined with the rotatable support or mounting of the at least one adjustment actuator, such that the supply unit and the adjustment actuator can rotate together relative to the carrier part, especially such that there is no rotation between the supply unit and the adjustment actuator, but only a joint rotation relative to the carrier part. Due to a joint pivot bearing for the adjustment actuator and the supply unit, a simple configuration with few parts and a space-saving design can be achieved. Furthermore, due to the absence of a rotational skew between the supply unit and the adjustment actuator, the energy supply connection between the supply unit and the adjustment actuator can be of a particularly simple configuration.

As a further development of the invention, it can be provided that the energy-supplying connection between the supply unit and the at least one adjustment actuator is integrated into the rotatable support bearing which supports the adjustment actuator on the adjustment drive carrier part and thus one by of the bearing rings, in particular when the supply unit and the at least one adjustment actuator are arranged on the opposite side of the preferably plate-shaped carrier part. Advantageously, the supply unit is connected with the adjustment drive by at least one pressurized-media channel leading through the support bearing. The support bearing has a double function: On the one hand it forms a rotatable linking point for the adjustment actuator, and on the other hand it supplies the energy for the adjustment actuator from the supply unit. That is why no separate duct recesses are necessary for the cables and tubes in the carrier part, thus preventing a weakening of the carrier part.

In an advantageous further development of the invention, the connection between the supply unit and the adjustment actuator can be completely without tubes and cables. The energy supply connection and a control connection that may also be necessary between the supply unit and the adjustment actuator can be integrated into said rotatable support bearing and led only through said support bearing. A part of the bearing structure such as a bearing bolt could comprise at least one energy supply hole for supplying the adjustment actuator with energy. By eliminating separate tube and cable connections, which would have to be conducted through separate duct recesses past the support bearing, not only can a weakening of the carrier part be prevented, but the collision problem mentioned above can be avoided which arises when the bearing rings rotate against each other and the adjustment actuators begin to swivel, since now, parts of the bearing structure no longer have any bulging cables or tubes. The at least one adjustment actuator may have tubes or lines for pressurized media on its outside or in the form of outside hydraulic pipes, but preferably no tubes or cables are present which would cross the carrier part carrying the adjustment drive.

In another advantageous embodiment of the invention, a bearing journal may be provided which penetrates the carrier part by which the adjustment actuator is supported and on which the supply unit is mounted, wherein said bearing journal may comprise at least one pressurized-media channel to connect the supply unit with the adjustment actuator for supplying it with energy. The said bearing journal can be rotatably mounted on the carrier part, for example by means of a suitable roller bearing and/or at least one suitable plain bearing. The components of the supply unit such as the pump, electric motor and pressure accumulator, can be combined in a pre-assembled module that is mounted as a unit on the bearing journals.

One such bearing journal may also be designed as a sleeve or otherwise as a part of the bearing structure on which the adjustment actuator may be supported on the one hand and the supply unit on the other hand.

Such a joint rotatability of the adjustment actuator and the supply unit related to the adjustment drive carrier part can be of advantage in particular when only a single adjustment actuator is provided for changing the pitch of the rotor blade or for rotating the bearing rings against each other, or when separate supply units are provided for changing the pitch of a rotor blade. The latter design can be achieved, for example, when each adjustment actuator is assigned to a supply unit, for example in the form of a pressure accumulator and/or a drivable pump which can be fastened to the bearing journal or a part of the bearing structure as mentioned above, on which the associated adjustment actuator is also supported.

In this case, each supply unit can be rotatably mounted with "its" adjustment actuator. Alternatively, only one supply unit with a dedicated adjustment actuator could be rotatably mounted related to the carrier part while the other supply unit could be rigidly, i.e. non-rotatably mounted on the carrier part. Still to allow energy supply through the rotatable support bearing of the adjustment actuator that is rotatable related to its energy supply unit on the carrier part, said rotatable support bearing can be provided with a rotatable duct for conducting pressurized media. Such a rotatable duct can be integrated in the support bearing.

However, in another alternative embodiment of the invention, a joint supply unit for several adjustment actuators can be provided, wherein in this case the supply unit can be rotatably mounted together with one of the adjustment actuators. One of the support bearings can comprise such a said energy duct wherein the pressurized media can be conducted through the rotatable duct by means of a suitable distributor on the actuator side of the carrier part to the various adjustment actuators, wherein the adjustment actuators can be arranged in star-shaped or successively connected form.

The adjustment actuators can be hydraulically connected in parallel or serially supplied by the supply unit in the sense of a master-slave arrangement.

When two adjustment actuators are provided in said manner, these can be arranged to rotate in opposite direction to each other such that to rotate the two bearing rings against each other, one of the adjustment actuators is extendable and the other is retractable. This prevents the formation of a pendular volume, and the pressure accumulator can be substantially smaller.

However, alternatively or additionally, at least two adjustment actuators can be provided which rotate alike such that to rotate the two bearing rings against each other, both adjustment actuators are simultaneously extendable and/or retractable.

In another embodiment of the invention, said adjustment drive carrier part which supports the at least one adjustment actuator or the several adjustment actuators, and on which the supply unit is mounted, can be substantially in the form of a plate and/or extend substantially across the rotation axis of the pivot bearing and/or extend over one of the bearing rings in the form of a lid. In particular, said carrier part can extend across the middle of the bearing and/or be connected with several bearing sections, especially also with opposite bearing sections, wherein in case of a plate-like design of the carrier, a revolving or multiple connection with the bearing ring can be provided. The carrier part can have a flat or at least almost continuous plate-like structure and/or it can substantially completely or at least for the most part lock the bearing ring, but it can also be designed in the shape of framework or lattice, or it may only consist of braces. Advantageously, said carrier part forms a stiffening element which stiffens a bearing ring and/or a bearing recess of the rotor hub against twisting, wherein said carrier part can advantageously be rigidly fastened on one of the bearing rings and/or the bearing recess of the rotor hub, for example by means of several threaded bolts.

On the other hand, the at least one adjustment actuator which is supported on said carrier part can be supported directly or indirectly on the other bearing ring that is rotatable relative to the bearing ring that is fastened to said carrier part, such that the two bearing rings can be rotated against each other through the extension or retraction or through the actuation of the adjustment actuator. Advantageously, the adjustment actuator can be linked to said bearing ring by means of another rotatable support bearing which directly rotatably supports the adjustment actuator on the bearing ring. The said support bearing can be attached directly on the bearing ring or be connected to an intermediate part connected to the bearing ring, for example in the form of a bearing flange or a fastening bracket.

Preferably, the direct or indirect linking of the at least one adjustment actuator to said other bearing ring can be provided by means of a support part which—other than said carrier part on which the other linking point of the adjustment actuator is provided—leaves the middle of the bearing free and is connected with said bearing ring only where the adjustment actuator is linked, i.e. in particular not connected with the opposite or other bearing ring sections. On said one-sided support part which can be designed as a bearing flange or fastening bracket, but also as an integral bearing ring section, a rotatable or articulated support bearing can be provided to support the adjustment actuator. With the one-sided linkage of the adjustment actuator, leaving the middle of the bearing open on said other bearing ring, good access to the at least one adjustment actuator can be achieved on the one hand, and on the other hand, a favourable direct application of force into the bearing ring can be achieved. Furthermore, this creates a maximum length of travel for the adjustment actuator which ensures a wide adjustment range without collision problems.

Another alternative continued development can be that another carrier part, in which said adjustment actuator engages, is rotatably connected with said bearing ring. This additional carrier part can be shaped as a plate as explained above, or it can have another structure and/or form a stiffening part which is connected to said bearing ring in the form of a lid, or it can be fastened to the rotor blade in the section where the bearing recess of the rotor blade is situated.

However, said fastening of the adjustment actuator directly or indirectly on the bearing ring means that the at least one adjustment actuator can be accommodated in a favourable position, providing it with sufficient travel. Also, a direct transmission of force with light-weight construction can be achieved.

In another embodiment of the invention, the outer ring of the pivot bearing can be connected with the rotor hub, and the inner ring with the rotor blade. In principle, an opposite arrangement of the bearing rings would be possible as well. However, a connection of the inner ring with the rotor blade facilitates its attachment to the rotor hub or to the pitch bearing connected to it.

The carrier part to which the at least one adjustment actuator and its supply unit are mounted can advantageously be connected with the outer ring and/or with the rotor hub, in particular in a non-rotatable way, wherein in this case, the second linking point of the at least one adjustment actuator is supported on the inner ring of the pivot bearing. However, in an alternative embodiment of the invention, said carrier part can also be non-rotatably connected with the inner ring, wherein in this case, the at least one adjustment actuator is supported on the outer ring.

In another embodiment of the invention, the support bearing for supporting the at least one adjustment actuator can—in addition to said energy supply duct—also comprise a signal duct, especially in the form of a signal line, which connects a system disposed on the adjustment actuators that measures travel and the adjustment angle with the supply unit or with a control component on the other side of the carrier part. The support bearing can thus have a triple function: a rotatable link for the adjustment actuator, an energy supply duct, and signal transmission.

In particular, said travel measuring system for recording the adjustment movements of the at least one adjustment actuator and/or rotational movements generated by it may comprise an angle sensor and/or a linear travel sensor integrated in the adjustment actuator, wherein a signal line from the angle sensor and/or travel sensor to the control device disposed on the supply unit is being conducted through the support bearing, for example by means of sliding contacts or a suitable signal line.

BRIEF DESCRIPTION OF THE FIGURES

Below, the invention is described in detail by means of preferred embodiments and with reference to the attached drawings.

DETAILED DESCRIPTION

Figure 1:
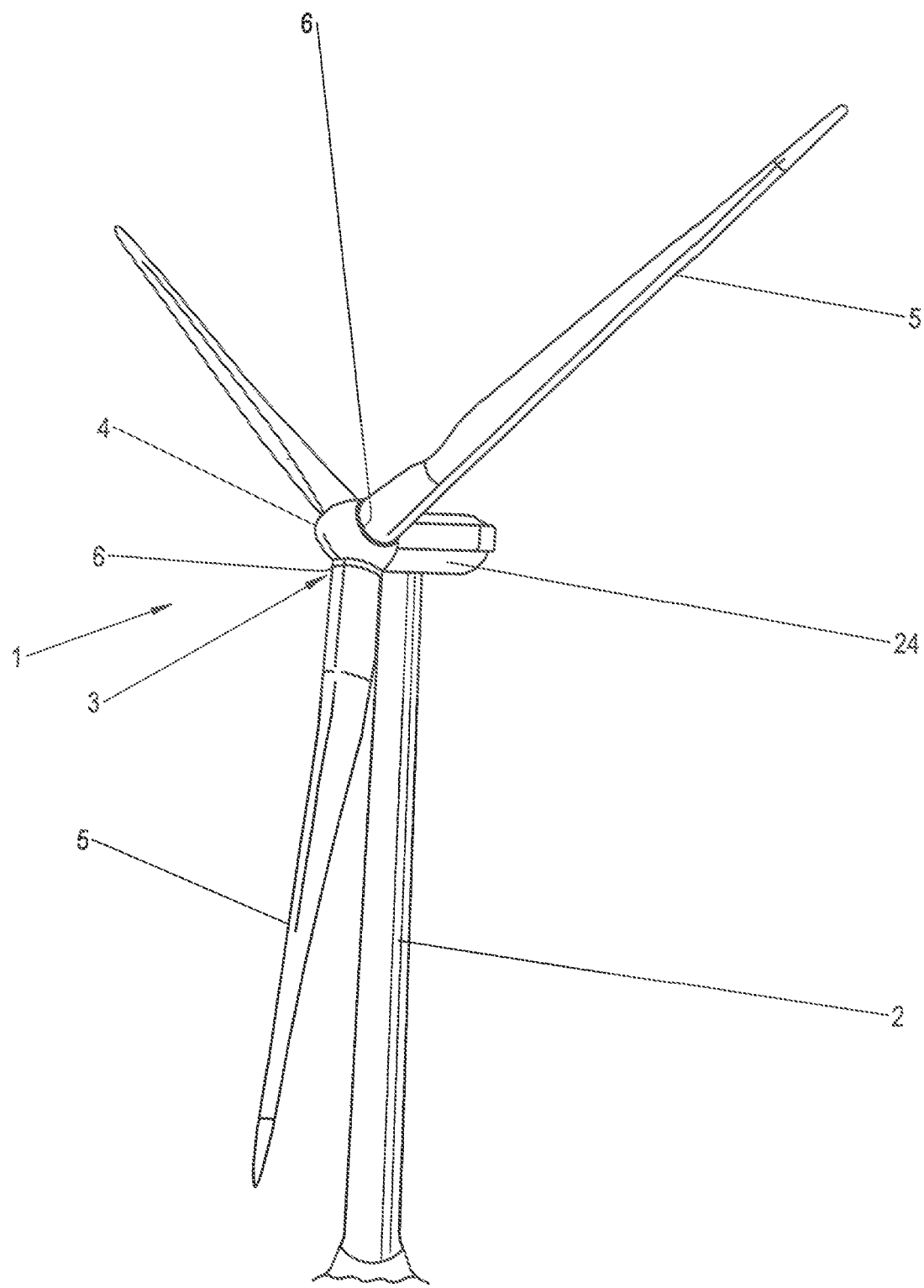
FIG. 1 shows a schematic perspective view of a wind turbine with pitch-adjustable rotor blades according to an advantageous embodiment of the invention.

As FIG. 1 shows, rotor 3 of wind turbine 1 can be rotatable about a horizontal rotor axis and mounted on a nacelle 24 which is disposed on a tower 2 and can be rotated about a vertical axis to align rotor 3 in wind direction. The control assemblies, the generator and additional energy converters and auxiliary assemblies can be accommodated in said nacelle 24 in a manner that is state of the art.

Rotor hub 4, which is rotatably mounted on nacelle 24 about the horizontal rotor axis carries several rotor blades 5 which are rotatably mounted on rotor hub 4 about longitudinal rotor blade axes such that the pitch angle of rotor blades 5 can be adapted to the operating conditions, in particular to the wind velocity and the switch-on status of the wind turbine. For this purpose, as FIG. 1 shows, each rotor blade 5 is mounted on rotor hub 4 by means of a so-called pitch bearing in the form of a pivot bearing 6.

Each said pitch or pivot bearing 6 comprises at least two rotatable coaxial bearing rings 7 and 8 (see FIG. 2) rotating against each other, whose rotation axis extends about parallel to each longitudinal rotor blade axis and/or radially to the rotor's rotation axis. In principle, said rotational bearing 6 can be constructed in various forms, particularly in the form of a roller bearing in which said bearing rings 7 and 8 can be supported by suitable roller elements such as elements formed as several axial and radial rows of bearings. The outer bearing ring 8 can be rigidly mounted on rotor hub 4, and the rotatable inner bearing ring 7 can carry the associated rotor blade 6 or can be rigidly connected with said rotor blade 5, although the opposite order is possible as well, i.e. inner ring 7 could be fastened on hub 4 and outer ring 8 on rotor blade 5.

To allow the pitch angle of each rotor blade 5 to be set in the desired manner, bearing rings 7 and 8 are provided with an adjustment unit 10 which advantageously can be disposed in the inner space which is substantially completely surrounded by bearing rings 7 and 8 and can rotate the two bearing rings 7 and 8 against each other.

The said adjustment unit 10 can be of electrohydraulic nature, wherein at least one preferably linear adjustment actuator 11 can be supplied with pressurized media by a supply unit 12 to activate adjustment actuator 11. The said supply unit 12 can comprise a pump 14 driven by an electric motor 15 to apply a suitable pressurized medium such as hydraulic fluid. The applied pressurized medium could be fed directly onto the at least one adjustment actuator 11 via suitable flow control means such as valves. Advantageously, supply unit 12 can also comprise at least one pressure accumulator 13, in particular also at least one low-pressure accumulator which can be filled or loaded by the pump 14. Pressure can then be applied to adjustment actuator 11 by the at least one pressure accumulator 13; see FIGS. 2 and 4.

Figure 4:
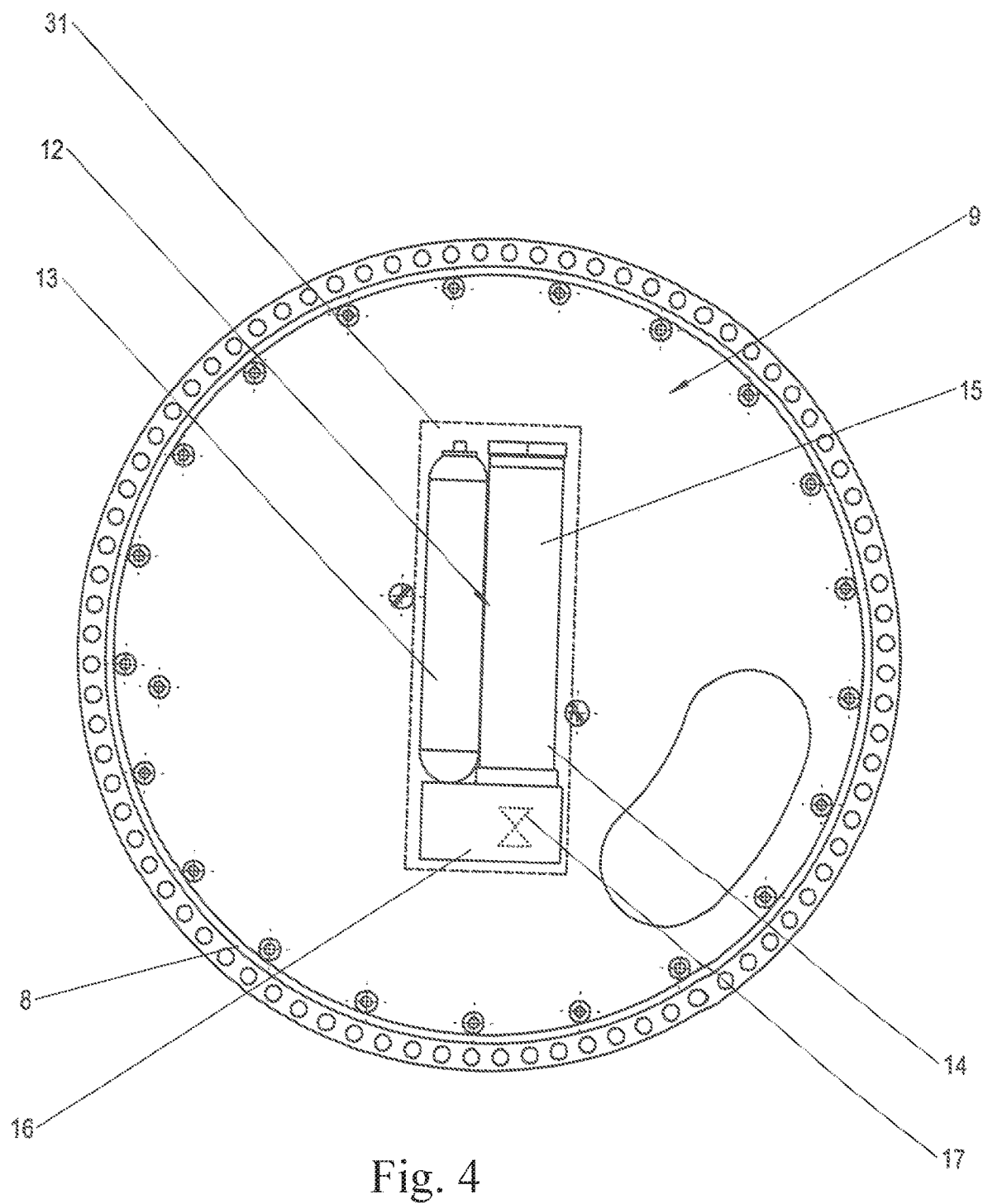
FIG. 4 shows atop view of the supply unit of the adjustment drive arranged on the plate-shaped carrier part, on the side opposite the adjustment actuators.

Advantageously, as shown in FIG. 4, the pressure applied to the at least one adjustment actuator 11 is controlled via a control device which comprises suitable flow control means such as one or more valves 17 which advantageously can be combined in a valve block 16 to which the pump 14 and/or at least one pressure accumulator 13 can be connected.

Advantageously, supply unit 12 can form a hydraulic self-sufficient system which generates the hydraulic pressure that must be provided. Supply unit 12 needs only a power supply plug to provide electric motor 15 with electric power to drive pump 14. The necessary control assemblies, in particular valve actuators which can be electromagnetic, and/or electronic control assemblies such as circuit boards can be integrated in supply unit 12.

Figure 2:
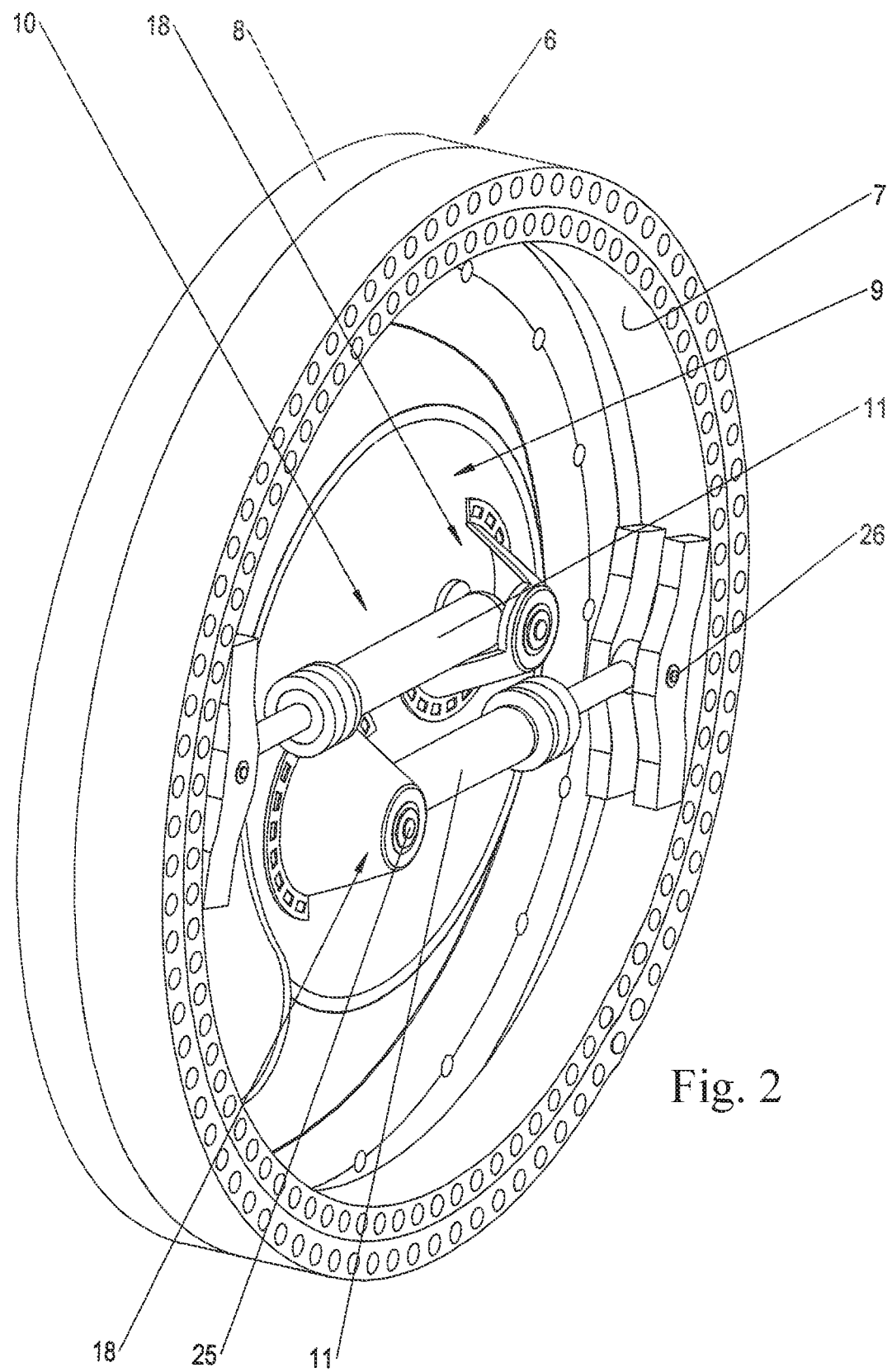
FIG. 2 shows a perspective schematic view of the pivot bearing and the adjustment drive integrated therein for rotating the two bearing rings against each other.
Figure 3:
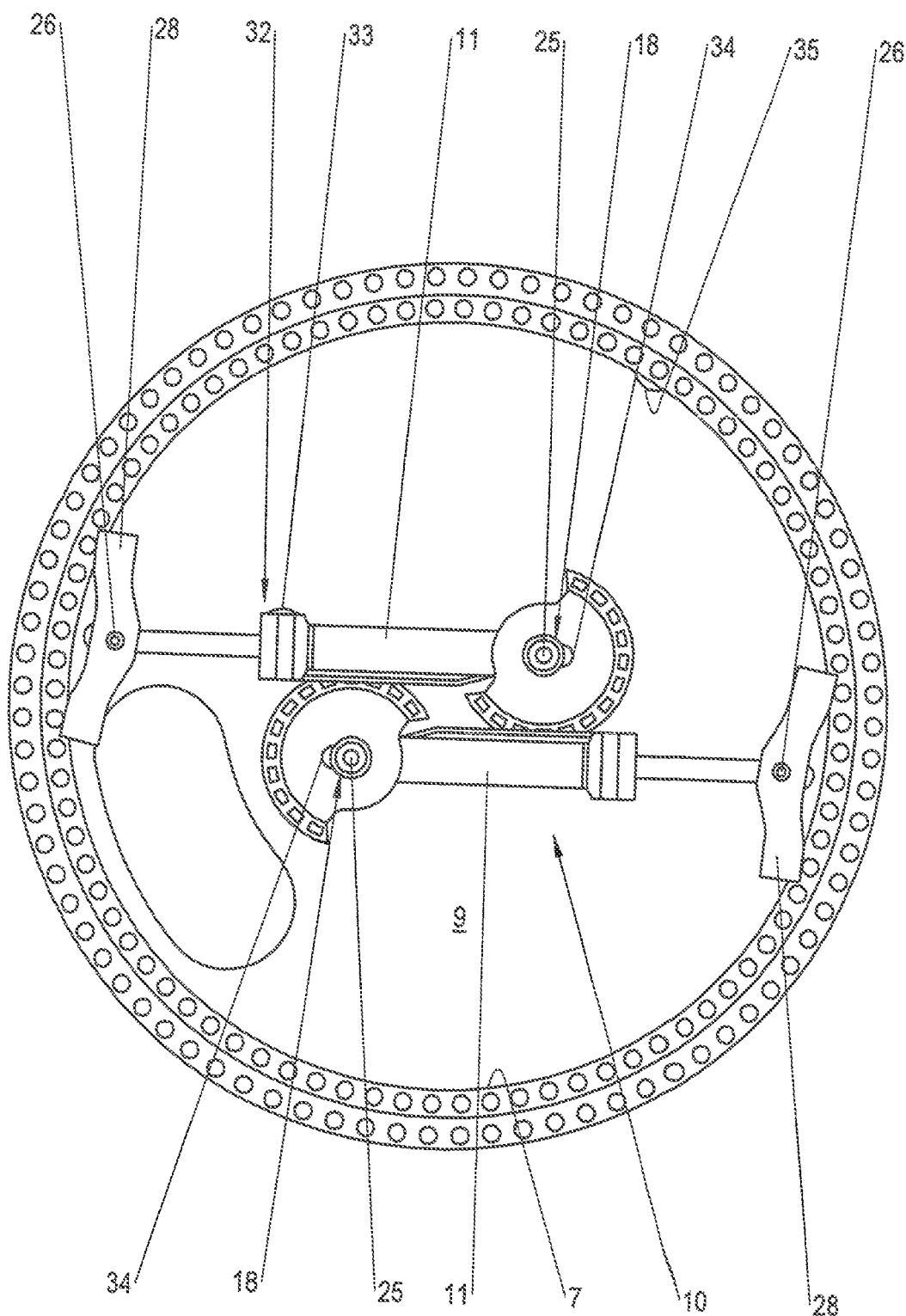
FIG. 3 shows a top view of the pivot bearing with the associated adjustment actuators, as shown in FIG. 2.

As a comparison between FIGS. 2 and 3 with FIG. 4 shows, supply unit 12 on the one hand and the at least one adjustment actuator 11 are arranged on different sides of a carrier part 9 which has the shape of a plate and can extend substantially across the rotation axis of pivot bearing 6. Advantageously, said carrier part 9 can be rigidly connected with the bearing ring which is rigidly fastened to rotor hub 4 and form a stiffening element for stiffening this bearing ring. The said carrier part 9 can, for example, form a kind of lid or wall which can substantially close bearing ring 8 completely, wherein a maintenance access hole can be provided in carrier part 9 to allow access to the inside of rotor blade 5 from rotor hub 4, wherein said maintenance access hole may also be lockable by a lid or a door.

Advantageously, the at least one adjustment actuator 11 is disposed on the rotor blade side of carrier part 9 and supply unit 12 is disposed on the hub side of carrier part 9, wherein supply unit 12 and the at least one adjustment actuator 11 have an overall flat, longitudinal configuration and can be disposed with their longitudinally extending axis across the rotation axis of pivot bearing 6 and/or arranged parallel to the carrier part 9; see FIGS. 2 to 6.

As FIGS. 2 and 3 show, according to an embodiment of the invention, two adjustment actuators 11 in the form of cylinder units can be provided which are eccentrically disposed toward the rotation axis of pivot bearing 8 to facilitate the rotational movement. On the one hand, adjustment actuators 11 have a linking point 25 on carrier part 9 and on the other hand a linking point 26 on bearing ring 7 connected with rotor blade 5, wherein said linking points 25 and 26 can be formed by pivotable or articulated support bearings which support adjustment actuators 11 directly or indirectly on carrier part 9 and on bearing ring 7.

As FIG. 3 shows, each adjustment actuator 11 is supported by a support bearing 18 on carrier part 9, wherein said support bearing 18 is articulated and/or rotatable and has at least one bearing rotation axis parallel to the rotation axis of pivot bearing 6.

Advantageously, the other linking point 26 on bearing ring 7 is also formed by a support bearing which can be appropriately disposed parallel to the pivot bearing, namely articulated and/or rotatable with at least one rotation axis. It can be linked to bearing ring 7 by means of a linking bracket 28 that is rigidly connected with bearing ring 7.

When linear adjustment actuators 11 are formed as cylinder units, the cylinder is advantageously supported on support bearing 18 provided on carrier part 9 such that the hydraulic supply passing through adjustment actuator 18 can be conducted directly into the cylinder. However, in principle, a reverse arrangement of adjustment actuators 11 would also be possible wherein pressurized fluid could be introduced via the piston rod.

The multiple adjustment actuators 11 can be arranged to rotate alike such that for the two bearing rings 7 and 8 to rotate against each other, both adjustment actuators 11 can be simultaneously extended and/or retracted, as shown in FIG. 3. However, as shown in FIG. 5, at least two adjustment actuators 11 can also be disposed which rotate in opposite direction such that to rotate the two bearing rings 7 and 8 against each other, one of the adjustment actuators is extendable and the other is retractable.

Figure 6:
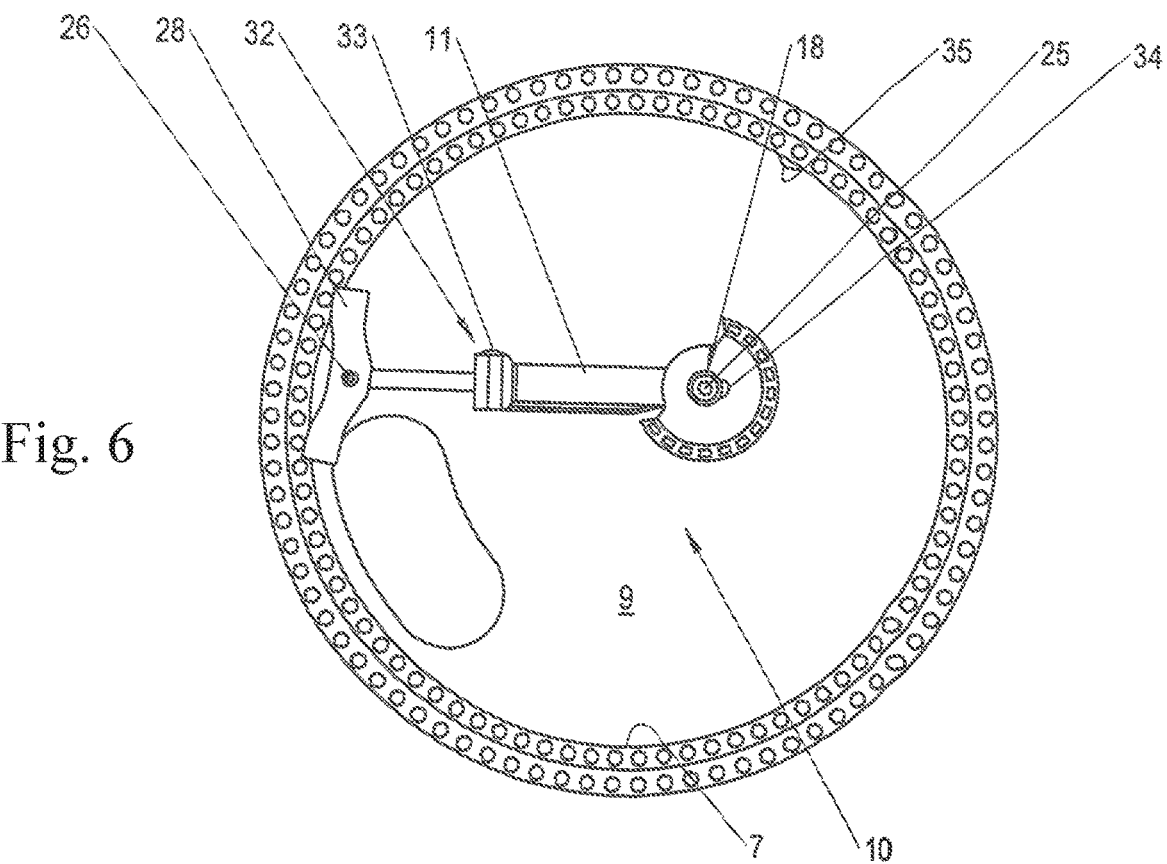
FIG. 6 shows a top view of a pivot bearing, similar to FIG. 3 and FIG. 5, wherein the adjustment drive in this version comprises only one adjustment actuator, and the supply unit is rotatably mounted on the plate-shaped carrier part together with the actuator.

As FIG. 6 shows, in principle only one adjustment actuator can also be sufficient, especially when only fairly small rotor blades must be rotated or if generally only fairly small adjustment forces or torques have to be mastered or applied.

Figure 5:
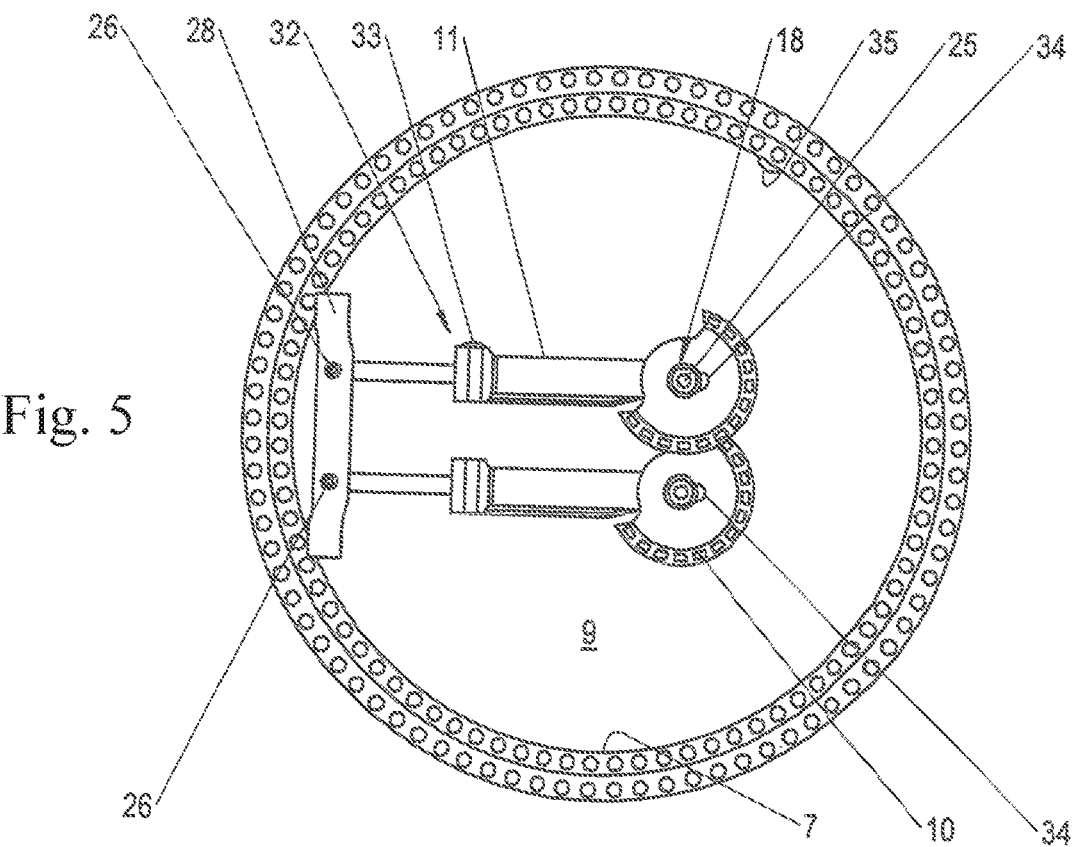
FIG. 5 shows a top view of a pivot bearing and the adjustment actuators disposed there, similar to FIG. 2, with the adjustment actuators arranged such that they rotate against each other.

If according to FIGS. 2 and 3 or FIG. 5, several adjustment actuators are provided, supply unit 12 can be rotatably connected to carrier part 9 together with one of the adjustment actuators. When adjustment unit 10 has only one adjustment actuator 11 for rotating bearing rings 7 and 8 against each other, as shown in FIG. 6, adjustment actuator 11 can similarly be directly or indirectly supported eccentrically on bearing ring 7 and have appropriate linking points 25 and 26 which are of either articulated or rotatable design.

Figure 7:
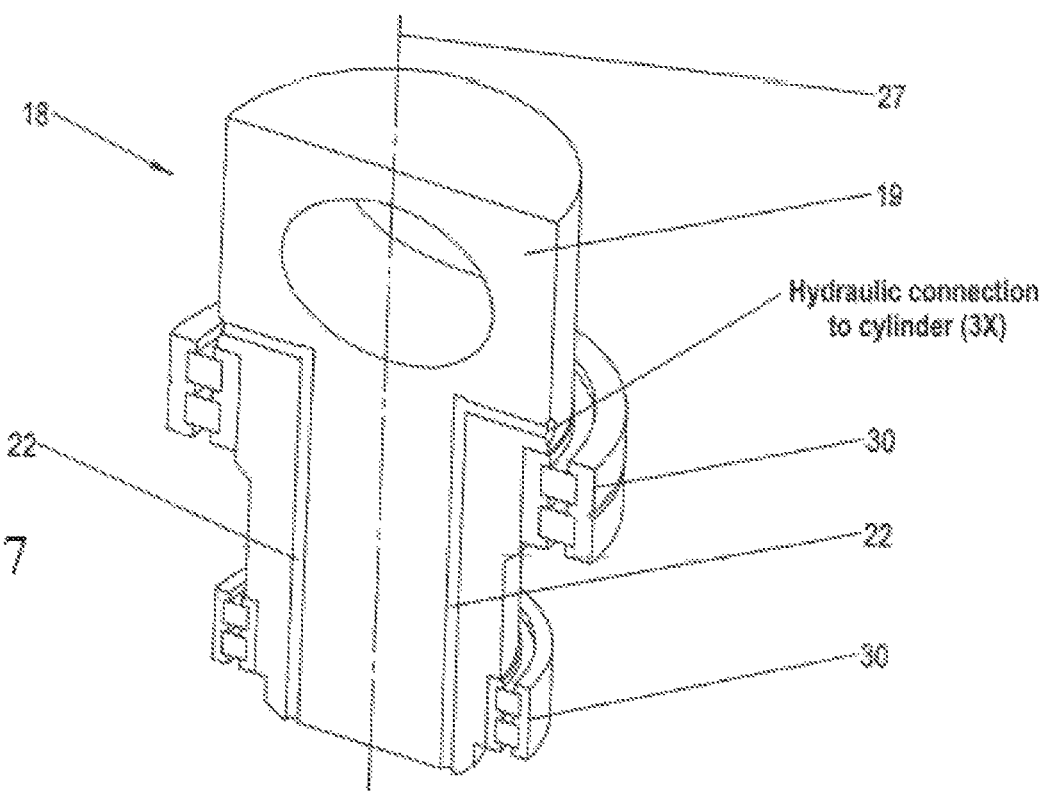
FIG. 7 shows a schematic sectional view of a rotatably mounted bearing journal for supporting the adjustment actuator shown in FIG. 6 on the carrier part, wherein the sectional view shows the hydraulic ducts to the pressurized-media supply of the adjustment actuator through the bearing journal.

In this case, adjustment actuator 11 is supported on bearing journal 19 which is led through carrier part 9 and is rotatably mounted on carrier part 9 about said bearing rotation axis 27, for example by means of one or more pivot bearings which are formed as roller bearings 30 and rotatably support bearing journal 19 on carrier part 9 (see FIG. 7).

In this case, support bearing 18 for supporting adjustment actuator 11 on carrier part 9 also has an integrated energy conduit in the form of pressurized-media channels. As FIG. 7 shows in comparison with FIG. 8, no rotatable duct is necessary, and supply unit 12 can be directly connected to bearing journal 19, thus providing an energy connection, in particular a hydraulic connection.

Advantageously, adjustment unit 10 can be non-rotatably fastened to the rotatably mounted bearing journal 19, such that the supply unit 12 can be rotated together with adjustment actuator 11 relative to carrier part 9. This means that there are no angular or rotational movements between supply unit 12 and adjustment actuator 11, such that supply unit 12 can be non-rotatably, i.e. rigidly disposed on bearing journal 10. Valve block 16 can be connected directly to hydraulic channels 22 in bearing journal 19.

For this purpose, supply unit 12 can be combined with its various components such as pressure accumulator 13 and/or pump 14 and/or electric motor 15 into a pre-assembled module that can be mounted as a unit on bearing journal 19, for example by means of a mounting bracket 31 that can be designed as a plate (see FIG. 4) and on the one hand carries supply unit 12 and on the other hand can be fastened to bearing journal 19.

Alternatively, it would also be possible to rotatably mount only one supply unit together with the associated adjustment actuator and to rigidly fasten another supply unit or other components of the supply unit to the carrier part. To compensate for the angular misalignment that occurs with adjustment movements between adjustment unit 10 and adjustment actuator 11, the respective support bearing 18 or the energy supply integrated therein can be designed as rotatable duct 29, as shown in FIG. 8.

Figure 8:
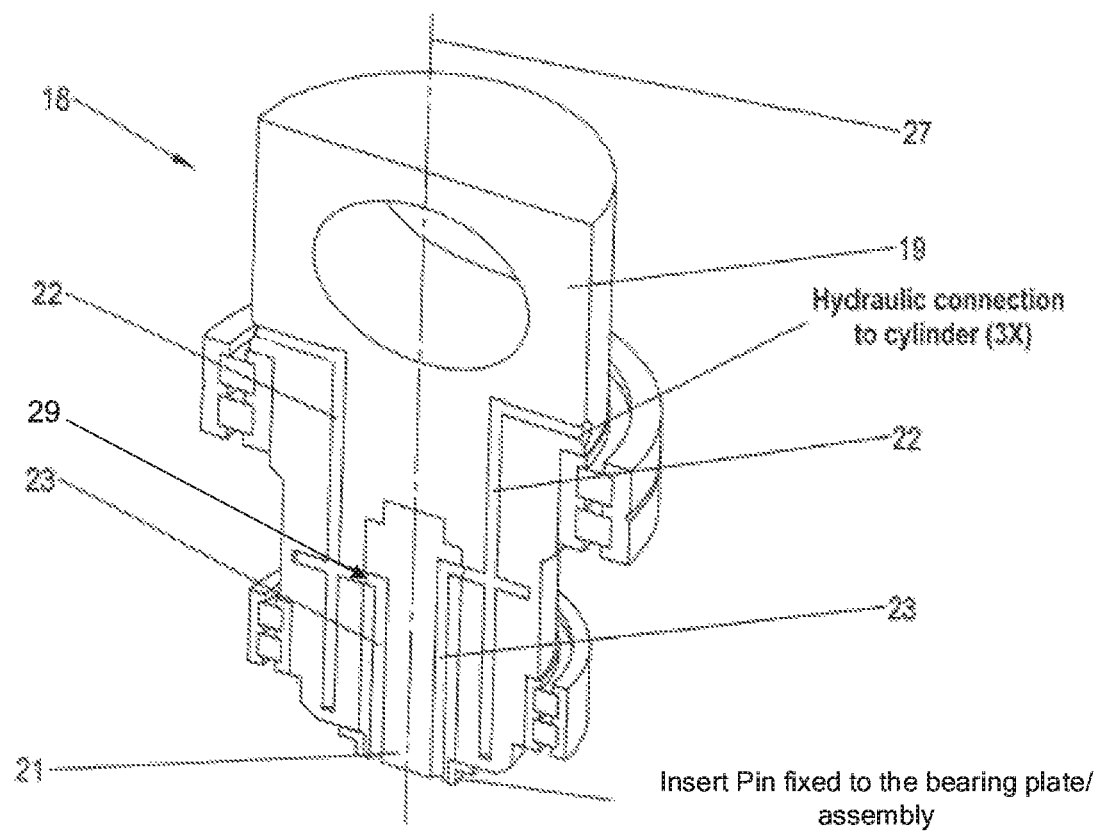
FIG. 8 shows a schematic sectional view of a bearing journal and the hydraulic rotatable duct integrated therein, with the hydraulic ducts disposed therein, thereby allowing the rotation of the supply unit against the adjustment actuator.

In this case, a bearing journal 19 supporting adjustment actuator 11 passing through carrier part 9 can be rotatably mounted to carrier part 9 about said bearing rotation axis 27, for example by means of one or more pivot bearings formed as roller bearings 30 and supporting bearing journal 19 on carrier part 9 (see FIG. 8). A rotating part, for example in the shape of a push rod/insert pin 21 can be rotatably engaged in bearing journal 19 and be arranged coaxially to said bearing journal 19 or its longitudinal rotation axis 27. For example, a substantially cylindrical push rod/insert pin 21 can be accommodated in a journal bore inside bearing journal 19, which protrudes in the front from bearing journal 19 toward the hub side and is rotatable related to bearing journal 19, such that push rod/insert 21 can be connected with supply unit 12, in particular with its valve block 16. In this case, said supply unit 12 can be rigidly, i.e. non-rotatably mounted on carrier part 9. Due to rotatable duct 29, bearing journal 19 can rotate in relation to the non-rotatably mounted supply unit 12 and still conduct hydraulic fluid to adjustment actuators 11.

As shown in FIG. 8, hydraulic channels 23 provided in the rotating part or push rod/insert pin 21 communicate with hydraulic channels 22 in bearing journal 19, independently of the rotational position, such that adjustment actuators 11 are supplied with pressurized fluid through support bearing 18.

To be able to exactly regulate the adjustment movements of the at least one adjustment actuator 11, adjustment unit 10 can be integrated in a suitable travel measuring system 32 with which the adjustment movement generated by adjustment actuator 11 and/or the associated opposite rotational movement of bearing rings 7 and 8 can be recorded. This is how the relevant travel measuring system can verify by means of feedback control and/or regulation whether a control signal transmitted to valve block 16 has produced an appropriate adjustment movement or whether it has to be readjusted.

As shown in FIG. 3, said travel measuring system 32 advantageously comprises one or more sensors which can be integrated in the at least one adjustment actuator 1 1and/or in its support bearing 18. In particular, a linear travel sensor 33 can be provided on adjustment actuator 11, in particular integrated in its cylinder unit, to directly record the adjustment movement of adjustment actuator 11. Alternatively or additionally, an angle detection sensor 34 can be integrated which records a rotation of the bearing journal 19 and/or the adjustment actuator 11 related to carrier part 9 to record a rotation of adjustment actuator 11 coinciding with an adjustment movement of adjustment actuator 11 related to carrier part 9, which rotation in turn is a measure for the opposite rotation of the bearing rings.

Alternatively or additionally, an angle sensor 35 can also directly measure the opposite rotation of bearing rings 7 and 8, and for that purpose, said angle sensor 35 is assigned to the two bearing rings 7 and 8, for example integrated in one of the bearing rings.

The invention claimed is:
1. An adjustment unit comprising:
a pivot bearing including two coaxial bearing rings that are rotatable with respect to one another,
at least one adjustment actuator for rotating the two bearing rings with respect to one another, and
a supply unit for supplying the at least one adjustment actuator with energy, the supply unit connected to at least one pressurized-media channel,
wherein the at least one adjustment actuator and the supply unit are disposed on an adjustment drive carrier part which is directly or indirectly rotatably connected with one of the bearing rings, and has a rotatable common support bearing for rotatably supporting the at least one adjustment actuator,
wherein the supply unit is rotatably mounted together with the at least one adjustment actuator rotatably at the carrier part such that the supply unit and the at least one adjustment actuator are rotatable and/or pivotable together with respect to the carrier part without any relative rotation with respect to one another,
wherein the support bearing comprises a bearing journal that passes through the carrier part and is rotatably supported at the carrier part, and the at least one adjustment actuator and supply unit each being rotatably fixedly supported on the bearing journal at oppositely disposed end sections of said bearing journal.

2. The adjustment unit according to claim 1, wherein a support bearing is provided for a rotatable support of the at least one adjustment actuator and the supply unit.

3. The adjustment unit according to claim 2, wherein the support bearing comprises a bearing journal which passes through the carrier part and is rotatably mounted on the carrier part, wherein the at least one adjustment actuator and the supply unit are non-rotatably mounted on opposite end sections of the bearing journal.

4. The adjustment unit according to claim 2, wherein the adjustment unit with the at least one adjustment actuator is connected with at least one pressurized-media channel which passes through the support bearing.

5. The adjustment unit according to claim 4, wherein an energy supply and/or a control connection between the supply unit and the at least one adjustment actuator is without tubes or cables and passes exclusively through the support bearing for non-rotatable support of the at least one adjustment actuator on the adjustment drive carrier part.

6. The adjustment unit according to claim 3, wherein the bearing journal comprises at least one pressurized-media channel for a hydraulic connection between the supply unit and the at least one adjustment actuator.

7. The adjustment unit according to claim 2, wherein the support bearing comprises a rotatable pressurized-media duct containing two rotatable bearing parts rotatable against each other, across whose interface a pressurized-media channel extends.

8. The adjustment unit according to claim 7, wherein the rotatable duct comprises a bearing journal and an insert pin push rod rotatably mounted to the rotatable duct, wherein at least one pressurized-media channel in the insert pin and the at least one pressurized-media channel in the bearing journal are in flow connection with each other.

9. The adjustment unit according to claim 8, wherein the supply unit is non-rotatably mounted on the carrier part and-connected through the rotatable duct with the bearing journal that is rotatable against the rotatable duct.

10. The adjustment unit according to claim 2, wherein the supply unit with its various components is combined into a pre-assembled module on a mounting support and is mountable as one unit on the carrier part or the support bearing.

11. The adjustment unit according to claim 2, wherein a control device for controlling the adjustment movements of the at least one adjustment actuator comprises a circuit board and a travel measuring system for recording adjustment movements of the at least one adjustment actuator and/or performs rotational movements generated by the at least one adjustment actuator, wherein the travel measuring system comprises an angle sensor integrated in the support bearing and/or a travel sensor integrated in the at least one adjustment actuator, wherein a signal line passes from the angle sensor and/or the travel measuring system to the control device disposed on the supply unit through the support bearing.

12. The adjustment unit according to claim 1, wherein the at least one adjustment actuator is linked in an articulated way to the said carrier part which is non-rotatably connected with one of the bearing rings and extends across a middle of the pivot bearing, and linked in an articulated way to the other bearing ring whereby the said other bearing ring comprises a support part that leaves the middle of the pivot bearing open and is connected only on the section where the at least one adjustment actuator is linked with it.

13. The adjustment unit according to claim 1, wherein at least two adjustment actuators are configured to act in directions opposite each other, so as to extend one of the at least two adjustment actuators and retract the other to rotate the two bearings against each other.

14. The adjustment unit according to claim 1, wherein at least two adjustment actuators are configured to act together in the same direction so as to be simultaneously extendable and/or simultaneously retractable to rotate the two bearing rings relative to each other.

15. A wind turbine with a rotor comprising:
rotor blades with adjustable pitch angles,
an adjustment unit to adjust the pitch angle of the rotor blades, the adjustment unit comprises:
 a pivot bearing including two coaxial bearing rings that are rotatable against each other,
 at least one adjustment actuator for rotating the two bearing rings against each other, and
 a supply unit for supplying the at least one adjustment actuator with energy, the supply unit connected to at least one pressurized-media channel,
 the at least one adjustment actuator and the supply unit are disposed on an adjustment drive carrier part which is directly or indirectly rotatably connected with one of the bearing rings, and
 the supply unit is rotatably mounted on the carrier part such that the supply unit and the at least one adjustment actuator are together rotatably mounted on the carrier part without rotating against each other, and that they are jointly rotatable and/or pivotable in relation to the carrier part, and
a support bearing comprises a bearing journal that passes through the carrier part and is rotatably supported at the carrier part, the at least one adjustment actuator and supply unit each being rotatably fixedly supported on opposing ends of the bearing journal, and the bearing journal extending between opposing faces of the carrier part.

16. The wind turbine according to claim 15, wherein an inner ring of the two bearing rings is non-rotatably connected with one of the rotor blades and an outer ring of the two bearing rings is non-rotatably connected with a rotor hub, wherein the said carrier part on which the at least one adjustment actuator is supported, is non-rotatably connected with the outer ring of the pivot bearing, and the at least one adjustment actuator is linked in an articulated way to the inner ring of the pivot bearing, wherein the said inner ring comprises a support part that leaves a middle of the bearing open and is connected with the inner ring only in the section where the at least one adjustment actuator is linked to it.

17. The adjustment unit according to claim 1, wherein the adjustment unit is for adjusting a pitch angle of a wind turbine rotor blade; and wherein the adjustment drive carrier part is plate-shaped.

18. The adjustment unit according to claim 10, wherein the various components of the supply unit are one or more of an electric motor, a pump, or a pressure accumulator.

19. The wind turbine according to claim 15, wherein the adjustment drive carrier part is plate-shaped.

* * * * *